United States Patent
Wu et al.

(10) Patent No.: US 10,008,708 B2
(45) Date of Patent: Jun. 26, 2018

(54) BATTERY PACK

(71) Applicant: Microvast Power Systems Co., Ltd., Huzhou, Zhejiang Province (CN)

(72) Inventors: Yang Wu, Honolulu, HI (US); Xiang Li, Huzhou (CN); Xuechun Liu, Huzhou (CN)

(73) Assignee: MICROVAST POWER SYSTEMS CO., LTD., Huzhou, Zhejiang Province (CN)

( * ) Notice: Subject to any disclaimer, the term of this patent is extended or adjusted under 35 U.S.C. 154(b) by 209 days.

(21) Appl. No.: 14/985,155

(22) Filed: Dec. 30, 2015

(65) Prior Publication Data
US 2016/0226053 A1 Aug. 4, 2016

(30) Foreign Application Priority Data

Feb. 3, 2015 (CN) .......................... 2015 1 0054328

(51) Int. Cl.
*H01M 2/20* (2006.01)
*H01M 2/02* (2006.01)
(Continued)

(52) U.S. Cl.
CPC ........... *H01M 2/206* (2013.01); *H01M 2/024* (2013.01); *H01M 2/1077* (2013.01);
(Continued)

(58) Field of Classification Search
CPC .. H01M 2/206; H01M 10/615; H01M 10/625; H01M 2/024; H01M 2/1077; H01M 10/052; H01M 2220/20; H01M 2300/0045; H01M 2300/0065; H01M 16/00; Y02E 60/122; Y02T 10/7011
USPC ............................................................ 429/9
See application file for complete search history.

(56) References Cited

U.S. PATENT DOCUMENTS 6,465,986 B1 * 10/2002 Haba ...................... H01M 2/20
                                                    320/116
7,115,332 B2 * 10/2006 Tanjou .................. H01M 10/42
                                                    429/61
(Continued)

FOREIGN PATENT DOCUMENTS

CN          1290405 A       4/2001
CN        100431199 C      11/2008
(Continued)

OTHER PUBLICATIONS

J-PlatPat Machine Translation of the detailed description of JP 2011-171043A. (Year: 2011).*

*Primary Examiner* — Gregg Cantelmo
(74) *Attorney, Agent, or Firm* — Cheng-Ju Chiang

(57) ABSTRACT

A battery pack includes a plurality of electrically connected battery modules. The battery module includes a plurality of type-A battery cells and a plurality of type-B battery cells. The type-A battery cells and the type-B battery cells are arranged in alternate manner. Both of the type-A and the type-B battery cells have a positive tab and a negative tab. The positive tabs and negative tabs of all type-A battery cells are electrically connected with a type-A first and a type-A second connecting pieces respectively. The positive tabs and negative tabs of all type-B battery cells are electrically connected with a type-B first and a type-B second connecting pieces respectively. When the battery pack burns, the type-A battery cells have an isolation effect on stopping the diffusion of combustion so as to improve the safety, and also improve the rapid charging and discharging ability and energy density of the battery pack.

20 Claims, 10 Drawing Sheets

(51) Int. Cl.
*H01M 2/10* (2006.01)
*H01M 10/052* (2010.01)
*H01M 10/625* (2014.01)
*H01M 10/615* (2014.01)

(52) U.S. Cl.
CPC ....... *H01M 10/052* (2013.01); *H01M 10/615* (2015.04); *H01M 10/625* (2015.04); *H01M 2220/20* (2013.01); *H01M 2300/0045* (2013.01); *H01M 2300/0065* (2013.01); *Y02E 60/122* (2013.01); *Y02T 10/7011* (2013.01)

(56) References Cited

U.S. PATENT DOCUMENTS

| | | | |
|---|---|---|---|
| 8,021,773 B1 * | 9/2011 | Simon | H01M 10/4207 429/149 |
| 2005/0208374 A1 * | 9/2005 | Sakurai | H01M 2/0275 429/162 |
| 2010/0304605 A1 * | 12/2010 | Osada | H01M 2/266 439/507 |
| 2011/0274956 A1 * | 11/2011 | Lin | H01M 2/1077 429/99 |
| 2013/0071717 A1 * | 3/2013 | Muniz | H01M 2/1094 429/120 |

FOREIGN PATENT DOCUMENTS

| | | | |
|---|---|---|---|
| CN | 102237547 A | | 11/2011 |
| CN | 202384436 U | | 8/2012 |
| CN | 204375861 U | | 6/2015 |
| JP | 2004014317 A | * | 1/2004 |
| JP | 2010282815 A | * | 12/2010 |
| JP | 2011171043 A | * | 9/2011 |

* cited by examiner

BATTERY PACK

CROSS REFERENCE TO RELATED APPLICATION

The present application is based on and claims priority of Chinese Patent Application No. 201510054328.6, filed on Feb. 3, 2015. The entire disclosure of the above-identified application, including the specification, drawings and claims are incorporated herein by reference in its entirety.

FIELD OF THE INVENTION

The present invention relates to a battery pack, and more particularly to a battery pack with flame retardant performance and high energy density.

BACKGROUND OF THE INVENTION

With dwindling of oil resources and increasing of environment pollution, energy conservation and emission reduction have become the trend in the world. Accordingly, electric vehicles such as hybrid electric vehicle, plug-in hybrids, and pure electric vehicles, have emerged and increased gradually. During driving, electric vehicles release less carbon dioxide than traditional internal combustion engine vehicles, and pure electric vehicles even release zero carbon dioxide. Moreover, the electric vehicles have an advantage of high energy conversion efficiency. These make the electric vehicles be recognized as an important substitute of internal combustion engine vehicles in the future.

Lithium-ion battery is known as a high energy density battery, and its organic electrolyte are flammable. Besides, lithium is highly reactive. These result some safety defects of lithium-ion battery. As being used as power battery, lithium-ion battery needs high capacity and high output power which results the lithium-ion battery generates much heat during operation and causes potential safety hazard. Especially, if the lithium-ion battery is used under harsh condition, such as thermal shock, over-charge, over-discharge and short circuit, the active material and the electrolyte inside the battery will conduct chemical and electrochemical reactions, which produce a large amount of heat and gas. When the heat and gas accumulate to a certain extent, it may give rise to battery burst which allows the active material inside the battery contacting with air and then causes explosion. Consequently, it's very important to improve safety design of lithium-ion battery.

Chinese Application No. CN201120526633.8, entitled "Close-packing lithium-ion battery pack", discloses a proposal of realizing uniform heat dissipation and flame retardant effect of lithium-ion battery. The battery pack includes a plurality of battery module, a plurality of spacing board, a plurality of aluminum separator, a plurality of aluminum cover and a bottom module cover. The spacing board and the aluminum separator separate battery cells from the battery modules, realizing requirements of omni-directional and uniform heat dissipation of the lithium-ion battery and overcoming a disadvantage of weak heat dissipation in a current battery pack. In addition, the close-packing lithium-ion battery pack is characterized by convenient manufacture and assembly, excellent heat dissipation efficiency, safety and reliability, and realizing a high-efficient continuous production procedure of the cell pack, and ensuring safety and reliability in application of the lithium-ion power cell effectively.

This proposal is beneficial of uniform heat distribution inside the battery pack, and transmitting heat to the aluminum separator is a relatively reasonable method. But it just works when the aluminum separator can meet the heat dissipation requirement of the battery pack before thermal runaway. The reason why thermal runaway occurs in the battery pack is that the heat can't be dissipated in time and accumulates in somewhere. That is to say, there are some limitations by using aluminum separators for heat dissipation, and it can't avoid the risk of thermal runaway completely.

SUMMARY OF THE INVENTION

In order to solve the abovementioned problems, the present invention provides a battery pack including a plurality of battery modules. The battery modules are electrically connected (such as parallel connected or series connected) with each other. The battery module includes a plurality of type-A battery cells and a plurality of type-B battery cells. The type-A battery cell is of flame retardant performance and its start-up temperature is higher than the type-B battery cell. The type-A battery cells and the type-B battery cells are arranged in an alternate manner. The type-B battery cell has a positive tab and a negative tab as well as the type-A battery cell. The positive tabs and the negative tabs of all the type-A battery cells are electrically connected with type-A first connecting pieces and type-A second connecting pieces respectively, and the type-A first connecting pieces and the type-A second connecting pieces are psychically separated and electrically isolated from each other. Similarly, the positive tabs and negative tabs of all the type-B battery cells are electrically connected with type-B first connecting pieces and type-B second connecting pieces respectively, and the type-B first connecting pieces and the type-B second connecting pieces are psychically separated and electrically isolated from each other. The type-A first connecting pieces and the type-A second connecting pieces are staggered and electrically isolated from the type-B first connecting pieces and the type-B second connecting pieces. In the battery module, the type-B battery cells are connected in parallel as well as the type-A battery cells. The parallel connected type-A battery cells are connected in series with the parallel connected type-B battery cells.

The battery pack is formed by a plurality of parallel connected battery modules. In each battery module, the type-A battery cells are connected in parallel and then are electrically connected with the type-A first connecting pieces and the type-A second connecting pieces before accessing to a power bus. In the same way, the type-B battery cells of each battery module are connected in parallel and then are electrically connected with the type-B first connecting pieces and the type-B second connecting pieces before accessing to the power bus.

The type-B battery cells are electrically connected with each other as well as the type-A battery cells. Although the type-A battery cells and the type-B battery cells exist in one battery module at the same time, they merely contact with each other physically and are electrically isolated.

The type-A battery cells and the type-B battery cells are arranged in an alternate manner. The type-A battery cells have flame retardant performance and high-temperature working performance. The type-B battery cells generate heat during working. The type-B battery cells absorb the heat generated by the type-B battery cells so that the type-A battery cells can reach an ideal working temperature rapidly and finally begin to work. This helps to dissipate heat for the whole battery pack as well as improve the total energy density of the battery pack. In addition, the alternate arrangement of the type-A battery cells and the type-B battery cells makes the type-B battery cells be physically separated by type-A battery cells. Therefore, the type-A battery cells can stop combustion from diffusion by separating the type-B battery cells in case the type-B battery cells combust because of thermal runaway.

Preferably, the type-B battery cells in the battery module are connected in parallel as well as the type-A battery cells. The parallel connected type-A battery cells are connected in series with the parallel connected type-B battery cells. The battery modules are connected in parallel with each other. This makes all of the battery modules have the same voltage, thereby overcoming the defect that different types of battery cells have different voltages. Furthermore, if the power supply needs to be to extended or amended, it only needs to increase or replace the battery module.

Preferably, the type-B battery cells in the battery module are connected in series as well as the type-A battery cells. The series connected type-A battery cells are connected in parallel with the series connected type-B battery cells. The battery modules are connected in parallel with each other. Due to the type-A battery cells and the type-B battery cells have different voltages, the type-A battery cells or the type-B battery cells must go through voltage converters and then connect in parallel before accessing to a power bus, in order to ensure stable output voltage and avoid reverse current between the battery cells.

Preferably, the type-B battery cells in the battery module are connected in series with each other as well as the type-A battery cells, and the type-A battery cells are electrically isolated from the type-B battery cells. The battery modules are connected in series with each other. Moreover, the type-A battery cells of different battery modules are connected in series with each other and the type-B battery cells of different battery modules are connected in series with each other. Due to the type-A battery cells and the type-B battery cells have different voltages, the type-A battery cells or the type-B battery cells must go through voltage converters and then connect in parallel before accessing to a power bus, in order to ensure stable output voltage and prevent reverse current between battery cells. It's possible to replace a single battery module because all the type-A or type-B battery cells go through voltage converters before accessing to the power bus.

The type-A battery cell has flame retardant performance and its start-up temperature is higher than the type-B battery cell. Preferably, the type-A battery cells includes ionic liquid electrolyte battery cells and/or solid electrolyte battery cells. The type-B battery cells can be ordinary-used organic electrolyte battery cells.

Ionic liquid is a kind of liquid organic salt consisting of negative ion and positive ion under room temperature, and it is also known as room temperature molten salt. It has electrical conductivity, and its decomposition voltage is higher than conventional electrolyte. It also has no phenomenon of solvent evaporation and leakage. Therefore, an ionic liquid battery cell has high-temperature working performance which means it can work in a wide temperature range and is nonflammable. Solid electrolyte battery cells have high safety performance and can undergo puncturing, heating, short circuit and overcharge (600%). Liquid electrolyte lithium-ion battery cells may have safety problems such as leakage, explosion and so on. While the solid batteries have no any safety problems except temperature rising slightly (<20° C.) and therefore have the effect of flame retardant.

Preferably, a heating device is arranged on a surface of the type-A battery cell where no type-B battery cell is in contact with the type-A battery cell.

The type-A battery cell has flame retardant performance and high-temperature working performance, while it also has the characteristic of poor low-temperature working performance. The charge and discharge processes of the type-B battery cell produce heat that will be absorbed by the type-A battery cell at the side which is in contact with the type-B battery cell, and the type-B battery cell needs a stable working temperature environment, therefore, there is no need to arrange a heating device. The heating device, which is arranged on another side of the type-A battery cell which is not in contact with the type-B battery cell, helps the type-A battery cell reach its working temperature rapidly and therefore improving working performance of the whole battery pack.

Preferably, the type-A battery cells are arranged at both ends of the battery module.

The type-A battery cells are arranged at both ends of the battery module in order to prevent diffusion of the combustion caused by abnormal work of the type-B battery cells. Furthermore, arranging the type-A battery cells at both ends of the battery module contributes to ensure the safety of battery pack because the type-A battery cell has good anti-deformation ability and puncture resistance, especially when battery packs working in some extreme situation such as traffic accident.

Preferably, the positive and the negative tabs of the type-A battery cell are arranged on upside or downside of the type-A battery cell. The positive and the negative tabs of the type-B battery cell are arranged on left and/or right side of the type-B battery cell. Support frames are arranged on the left and/or right side of the type-B battery cell to separate the side surface with electrodes of the type-B battery cell from the type-B first connecting pieces and the type-B second connecting pieces.

Taken soft-package battery cells as example, in assembly process, the longer side acts as bottom side, and the positive and the negative tabs of the type-A battery cells are arranged on upside or downside, which makes the positive and the negative tabs of the type-A battery cells be in upside or downside simultaneously. The positive and the negative tabs of the type-B battery cells are arranged on the left and/or the right sides of the type-B battery cells respectively. This makes the positive and the negative tabs of the type-A battery cells physically stagger from the positive and the negative tabs of the type-B battery cells. Finally, when the positive and the negative tabs of the type-A battery cells electrically connecting with the type-A first connecting pieces and the type-A second connecting pieces respectively, and the positive and the negative tabs of the type-B battery cells electrically connecting with the type-B first connecting pieces and the type-B second connecting pieces respectively, they are independent and electrically isolated from each other.

Support frames are arranged on the positive and the negative tabs and on the left and/or right side of the type-B battery cell to separate the side surface with electrodes of the type-B battery cell from the type-B first connecting pieces and the type-B second connecting pieces.

When being arranged at the left and/or right side of the battery cell, the tabs may be broken when vibration is generated during the operation of the battery pack due to the tab is made of soft material. It contributes to the stability of tabs by arranging support frames between the side surface of the type-B battery cell and the type-B first and second connecting pieces. Even though vibration occurs in battery pack, the support frames can also play the role of fixing and buffering.

Preferably, the positive and the negative tabs of the type-A battery cell are arranged on the upside or downside of the type-A battery cell, and the positive and the negative tabs of the type-B battery cell are arranged on the upside or downside of the type-B battery cell.

Taken soft-package battery cells as example, the positive and the negative tabs of a soft-package battery cell are usually arranged on a same side. The positive and the negative tabs of the type-A battery cells are arranged on the upside of the type-A battery cells, and the positive and the negative tabs of the type-B battery cells are arranged on the downside of the type-B battery cells. After the type-A battery cells and the type-B battery cells being stacked together, the positive and the negative tabs of the type-A battery cells physically stagger from the positive and the negative tabs of the type-B battery cells. After the positive and the negative tabs of all the type-A battery cells are electrically connected with the type-A first connecting pieces and the type-A second connecting pieces respectively, and the positive and the negative tabs of all the type-B battery cells are electrically connected with the type-B first connecting pieces and the type-B second connecting pieces respectively, all the connecting pieces are independent and electrically isolated from each other. In another situation, the positive and the negative tabs of the type-A battery cells are arranged on the downside of the type-A battery cells, and the positive and the negative tabs of the type-B battery cells are arranged on the upside of the type-B battery cells. If the positive and the negative tabs of the type-A battery cells and the positive and the negative tabs of the type-B battery cells are arranged on the same side, i.e., both on the upside or both on the downside, of the corresponding type-A and type-B battery cells, the type-A battery cells and the type-B battery cells may be stacked in an inverted manner. That is, the upside of the type-A battery cells or the type-B battery cells are inverted to downside while the direction of the type-B battery cells or the type-A cells are remained as normal.

Preferably, the positive and the negative tabs of the type-A battery cell are arranged on the upside or downside of the type-A battery cell, and the positive and the negative tabs of the type-B battery cell are arranged on the upside or downside of the type-B battery cell. The positive and the negative tabs of the type-A battery cell are staggered from the positive and the negative tabs of the type-B battery cell. After being stacked, the positive tab stacks and negative tab stacks of the type-A battery cells are electrically isolated from the positive tab stacks and negative tab stacks of the type-B battery cells.

Taken soft-package battery cells as example, the positive and the negative tabs of the type-A battery cell are arranged on the upside of the type-A battery cell, and the positive and the negative tabs of the type-B battery cell are arranged on the upside of the type-B battery cell. Positions of projections of the positive and the negative tabs of the type-B battery cell on the type-A battery cell stagger from positions of the positive and the negative tabs of the type-A battery cell. After the type-A battery cells and the type-B battery cells of one battery module being stacked together, the positive tab stacks and the negative tab stacks of the type-A battery cells psychically stagger from and electrically isolate from the positive tab stacks and the negative tab stacks of the type-B battery cells.

Preferably, the positive and the negative tabs of the type-A battery cell are arranged on the left or the right side of the type-A battery cell, and the positive and the negative tabs of the type-B battery cells are arranged on the left or the right side of the type-B battery cell. The type-A battery cells and the type-B battery cells are arranged along left-right direction in an inverted manner. That is, the type-A battery cells and the type-B cells are arranged in a manner that the left and the right sides of the type-A battery cells correspond to and contact with the right and the left sides of the type-B battery cells, respectively. Support frames are arranged on the side where the positive and the negative tabs of the type-A battery cells locate, and separate the side surface of the type-A battery cells from the type-A first and second connecting pieces. In the same way, support frames are arranged on the side where the positive and the negative tabs of the type-B battery cells locate, and separate the side surface of the type-B battery cells from the type-B first and second connecting pieces.

Taken soft-package battery cells as example, the positive and the negative tabs of the type-A battery cells are arranged on the left side of the type-A battery cells, and the positive and the negative tabs of the type-B battery cells are arranged on the right side of the type-B battery cells. When the type-A battery cells and the type-B battery cells are stacked together in one battery module, the positive and the negative tabs of the type-A battery cells are connected with the type-A first and second connecting pieces respectively, and the positive and the negative tabs of the type-B battery cells are connected with the type-B first and second connecting pieces respectively. Meanwhile, the positive tab stacks and negative tab stacks of the type-A battery cells are physically non-contacted with and electrically isolated from and the positive tab stacks and negative tab stacks of the type-B battery cells.

Support frames are arranged on the positive and the negative tabs and on the left or right side of the type-A battery cells and the type-B battery cells. The support frames separate the side surface of the type-A battery cells from the corresponding type-A first and second connecting pieces, and in the same way the support frames separate the side surface of the type-B battery cells from the corresponding type-B first and second connecting pieces. Due to the tab is made of soft material, it may be broken by vibration generated during the operation of the battery pack if the tabs are arranged on the left and the right side surfaces of a battery cell. It contributes to the stability of tabs by arranging support frames between the connecting pieces and the side surfaces of the corresponding battery cells. Even though vibration occurs in the battery pack, the support frames can play the role of fixing and buffering.

Preferably, the positive and the negative tabs of the type-A battery cells are arranged on the left and the right sides of the type-A battery cells respectively, and the positive and the negative tabs of the type-B battery cells are arranged on the left and the right sides of the type-B battery cells respectively. The positive and the negative tabs of the type-A battery cells and the positive and the negative tabs of the type-B battery cells are staggered. After being stacked, the positive tab stacks of the type-A battery cells are psychically staggered from and electrically isolated from the positive tab stacks of the type-B battery cells, and the negative tab stacks of the type-A battery cells are psychically staggered from and electrically isolated from the negative tab stacks of the type-B battery cells. Support frames are arranged on the left and the right sides of the type-A battery cells, and separate the side surface of the type-A battery cell from the corresponding type-A first and second connecting pieces. Likewise, support frames are arranged on the left and the right sides of the type-B battery cells, and separate the side surfaces of the type-B battery cells from the corresponding type-B first and second connecting pieces.

Taken soft-package battery cells as example, the positive and the negative tabs of the type-A battery cell are arranged on the left and the right sides of the type-A battery cell respectively, and the positive and the negative tabs of the type-B battery cell are arranged on the left and the right sides of the type-B battery cell respectively. The positive and the negative tabs of the type-A battery cells and the positive and the negative tabs of the type-B battery cells are staggered. After the type-A battery cells and the type-B battery cells of one battery module are stacked together, the positive tab stacks and negative tab stacks of the type-A battery cells are psychically staggered from and electrically isolated from the positive tab stacks and negative tab stacks of the type-B battery cells.

Support frames are arranged on the positive and the negative tabs and on the left and the right sides of the type-A battery cells and the type-B battery cells. The support frames separate the side surfaces of the type-A battery cells from the corresponding type-A first and second connecting pieces, and in the same way the support frames separate the side surfaces of the type-B battery cells from the corresponding type-B first and second connecting pieces. Due to the tab is made of soft material, it may be broken by vibration generated during the operation of the battery pack if the tabs are arranged on the left and the right sides of a battery cell. It contributes to the stability of tabs by arranging support frames between the connecting pieces and the side surfaces of corresponding battery cells. Even though vibration occurs in a battery pack, the support frames can play the role of fixing and buffering.

The theme of the present invention is not limited to lithium-ion battery. The present invention just describes some technical schemes which are a part of the invention. The technical schemes about square battery, cylindrical battery and the batteries which are just in different shapes should be within the scope of the present invention.

In accordance with the technical schemes provided by the present invention, the type-A battery cells and the type-B battery cells are arranged in alternate manner. The type-A battery cells (such as ionic liquid electrolyte battery cells or solid electrolyte battery cells) have better flame retardant performance. If the battery pack burns, the type-A battery cells have an isolation effect on stopping the diffusion of combustion, which improves the safety and also improves rapid charging and discharging capability and energy density of the battery pack. On the other hand, the type-A battery cell has higher working temperature range, and the heat generated by the type-B battery cells is absorbed by the type-A battery cells next to them. It improves the heat dissipation effect of the type-B battery cells and working efficiency of the type-A battery cells as well.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Embodiment 1

Figure 1:
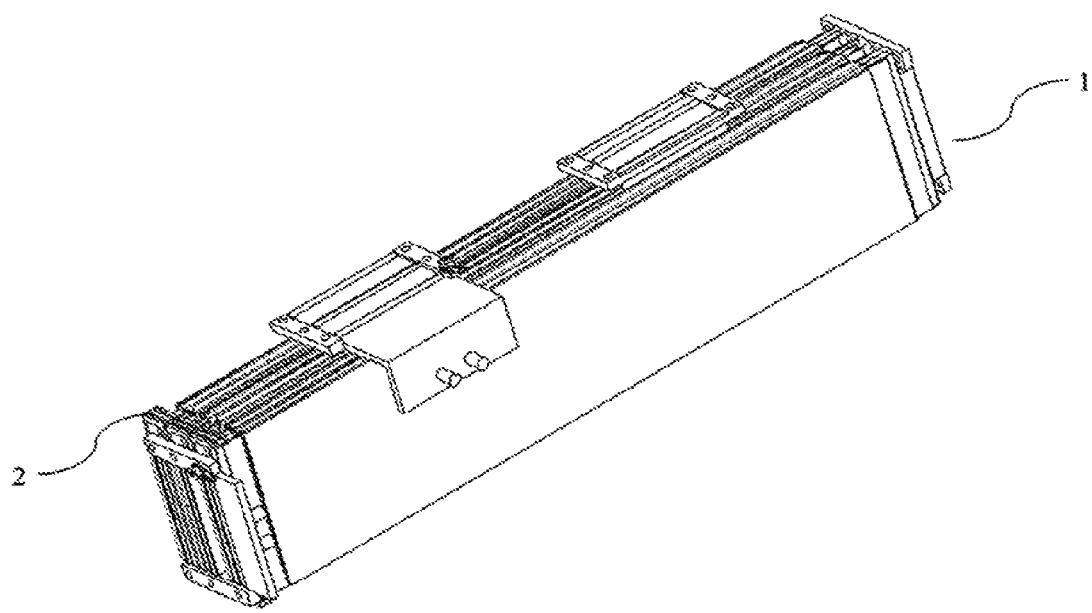
FIG. 1 is a schematic view of a battery module according to an embodiment of the present invention.
Figure 2:
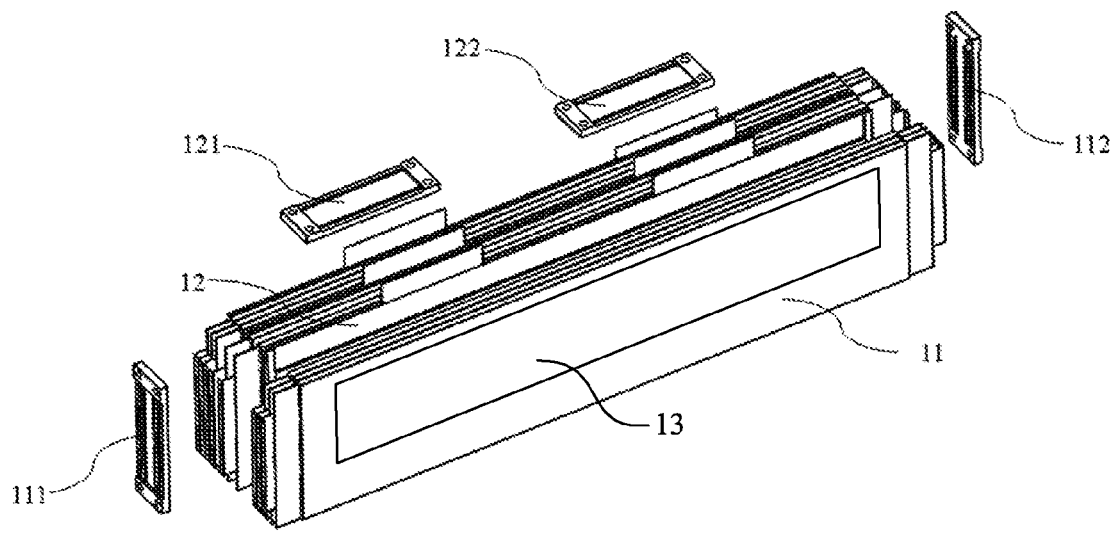
FIG. 2 is an explosion, schematic view of a battery module according to an embodiment of the present invention.
Figure 3:
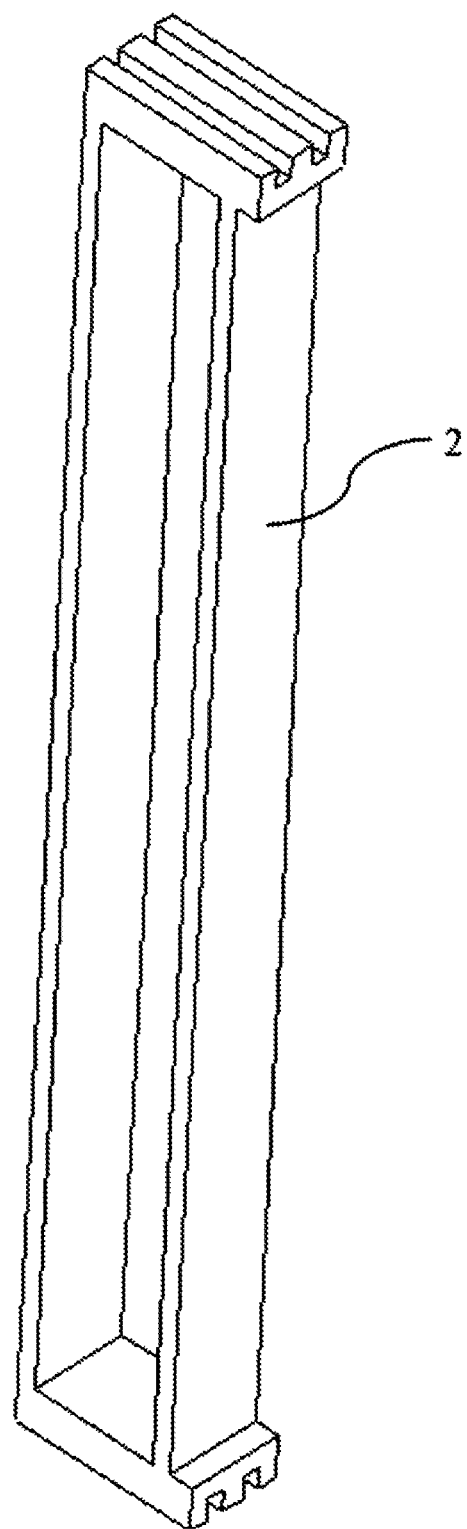
FIG. 3 is a schematic view of a support frame of the battery module according to an embodiment of the present invention.
Figure 4A:
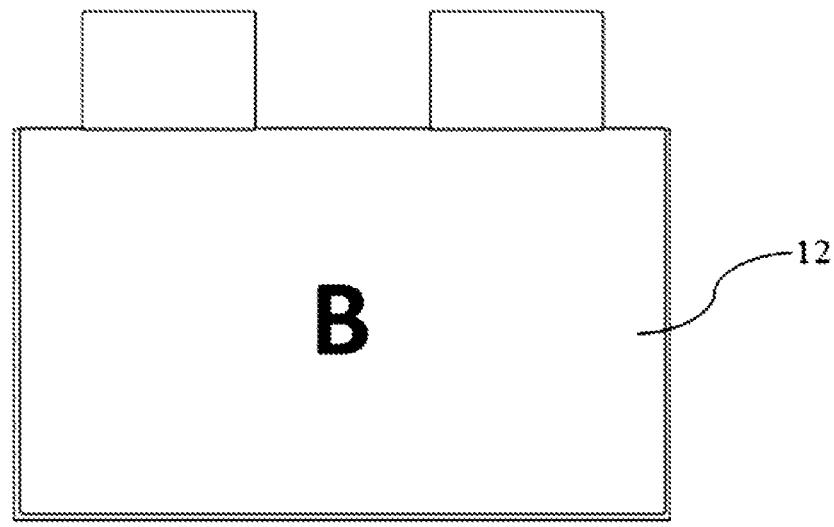
FIGS. 4a and 4b are schematic views of type-A and type-B battery cells according to a first embodiment of the present invention.
Figure 4B:
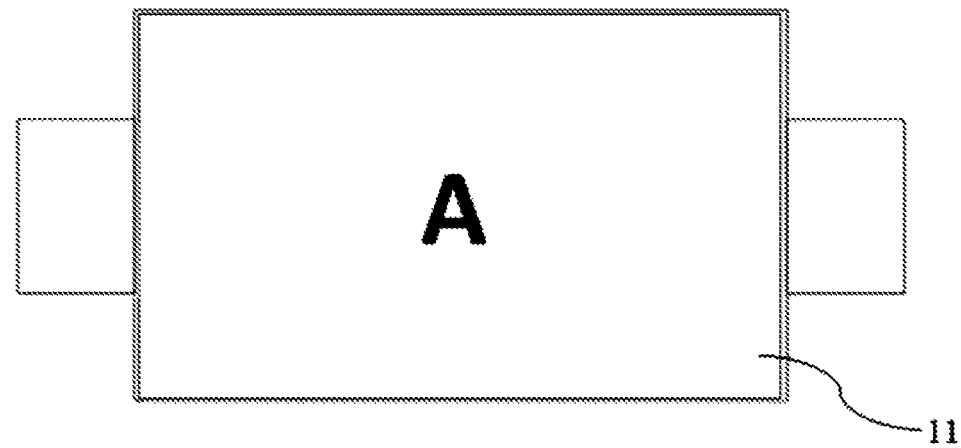
Figure 10:
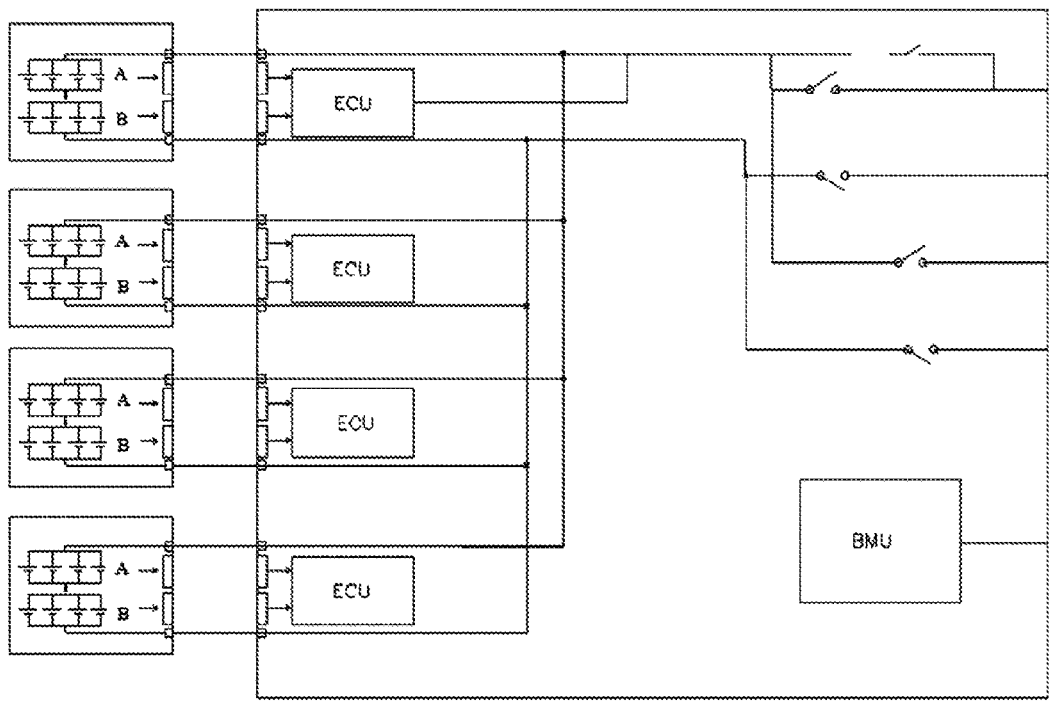
FIG. 10 is a schematic view of a circuit of the battery pack according to a first embodiment of the present invention.

Referring to FIG. 1 to FIG. 4b and FIG. 10, a battery pack of the present embodiment includes a plurality of battery modules 1. The battery modules 1 are connected in parallel. The battery module 1 includes a plurality of type-A battery cells 11 and a plurality of type-B battery cells 12. The type-A battery cell 11 has a positive tab and a negative tab, and the type-B battery cell 12 has a positive tab and a negative tab. The positive tab and the negative tab of the type-A battery cell 11 are arranged on the left and the right sides of the type-A battery cell 11 respectively, while the positive tab and negative tab of the type-B battery cell 12 are arranged on the upside or the downside of the type-B battery cell 12. After being stacked together, the type-A battery cells 11 and the type-B battery cells 12 need to meet the requirements as following: the positive tab stacks and the negative tab stacks of the type-A battery cells 11 are psychically staggered and electrically isolated from the positive tab stacks and the negative tab stacks of the type-B battery cells 12; support frames 2 are arranged on the positive and the negative tabs and on the left and the right sides of the type-A battery cells 11; the support frames 2 separate the left and the right side surfaces of the type-A battery cells 11 from a corresponding type-A first connecting piece 111 and a corresponding type-A second connecting piece 112 respectively. It helps fix and reduce impacts on the tabs, so as to prevent the tabs from being broken by impacts generated during vibration.

In each battery module 1, the type-A battery cells 11 are connected in parallel and then their positive tabs and negative tabs are electrically connected with the type-A first connecting piece 111 and the type-A second connecting piece 112 respectively before accessing to a power bus. The type-B battery cells 12 in the battery module 1 are connected in parallel and then their positive tabs and negative tabs are electrically connected with a type-B first connecting piece 121 and a type-B second connecting piece 122 respectively before accessing to the power bus. The type-A first connecting piece 111 and the type-A second connecting piece 112 are physically separated and electrically isolated from each other. The type-B first connecting piece 121 and the type-B second connecting piece 122 are physically separated and electrically isolated from each other. The type-A first connecting piece 111 and the type-A second connecting piece 112 are psychically staggered and electrically isolated from the type-B first connecting piece 121 and the type-B second connecting piece 122. In the battery module 1, the type-B battery cells 12 are connected in parallel as well as the type-A battery cells 11. Then, the parallel connected type-A battery cells 11 are connected in series with the parallel connected type-B battery cells 12. In the battery module 1, the type-A battery cells 11 and the type-B battery cells 12 correspond to different ECUs (Electronic Control Units) respectively. The information collected by all the ECUs is fed back to BMU (Battery Management Unit), and BMU finally controls its discharging.

The type-A battery cell 11 is a kind of battery cell with flame retardant performance and high temperature working performance. In the embodiment, the type-A battery cell 11 may be ionic liquid battery cell, or solid electrolyte battery cell. The start-up temperature of the type-A battery cell 11 is higher than the type-B battery cell. The type-B battery cells 12 are electrically connected with each other as well as the type-A battery cells 11. Although two kinds of battery cells exist in one battery module 1 at the same time, the type-A battery cells 11 and the type-B battery cells 12 are merely physically contact with each other by arranging several type-A battery cells 11 between adjacent two type-B battery cells 12. The heat generated by the type-B battery cells 12 during charging and/or discharging can be absorbed by the type-A battery cells 11, which not only helps dissipate heat for the type-B battery cells 12 but also heat up the type-A battery cells 11 to an optimum working temperature. In one battery module 1, the two kinds of battery cells are electrically isolated from each other, and are electrically connected with the corresponding connecting pieces respectively. Alternate arrangement of the type-B battery cells 12 and the several type-A battery cells 11 makes the type-B battery cells 12 be physically separated by the type-A battery cells 11, which have a flame retardation effect on the type-B battery cells 12 when burning or heating excessively. The amount ratio of the type-A battery cells 11 and the type-B battery cells 12 in a single battery module 1 is 3:1, which improves energy density of the battery pack.

In this embodiment, it will take a long time for the type-A battery cells 11 to reach the optimum working temperature if the temperature of the type-A battery cells 11 is only risen by the heat generated during charging and/or discharging of the type-B battery cells 12. Therefore, a heating device 13 such as a film heater is arranged to the type-A battery cell 11 on the side surface where the type-A battery cell 11 don't contact with the type-B battery cell 12. All the film heaters are powered by the type-B battery cells 12 which reach the optimum working temperature earlier. Furthermore, the type-A battery cells 11 are arranged at both ends of the battery module 1, which makes the outermost two cells of the battery module 1 be type-A battery cells 11, to improve safety of the battery pack.

Embodiment 2

Figure 11:
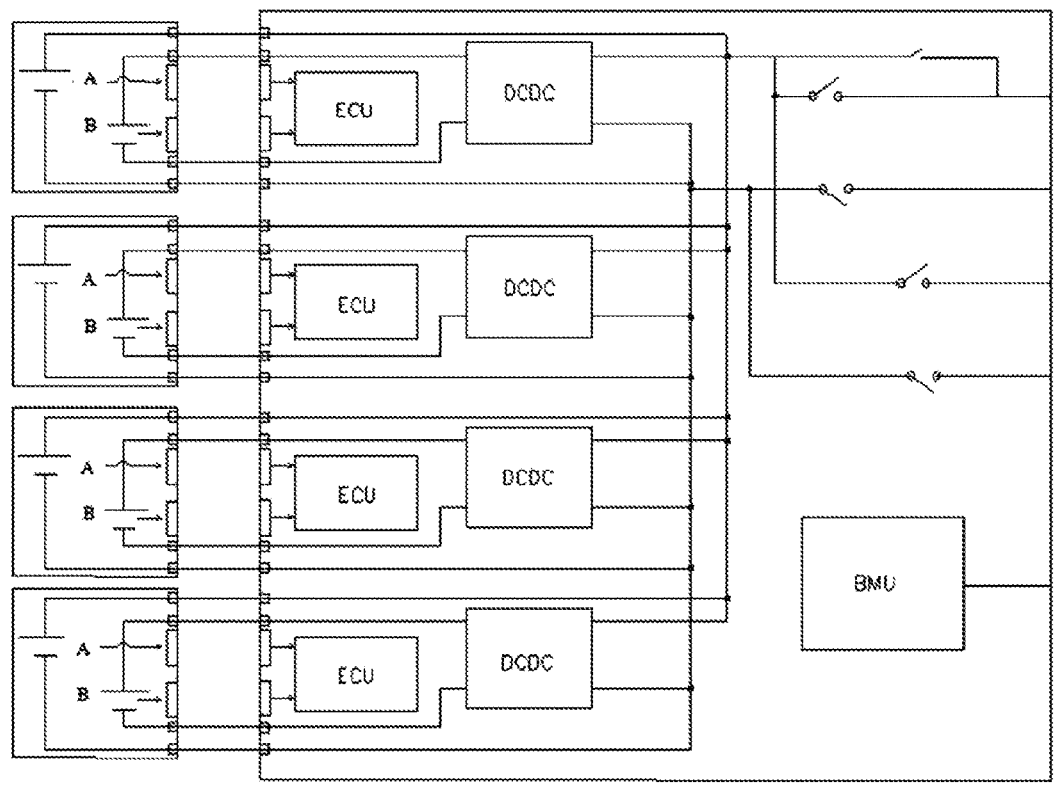
FIG. 11 is a schematic view of a circuit of the battery pack according to a second embodiment of the present invention.

Referring to FIG. 1 to FIG. 4b and FIG. 11, a battery pack of the present embodiment includes a plurality of battery modules 1. The battery modules 1 are connected in parallel. The battery module 1 includes a plurality of type-A battery cells 11 and a plurality of type-B battery cells 12. The type-A battery cell 11 has a positive tab and a negative tab, and the type-B battery cell 12 has a positive tab and a negative tab. The positive tab and the negative tab of the type-A battery cell 11 are arranged on the left side and the right side of the type-A battery cell 11 respectively, while the positive tab and the negative tab of the type-B battery cell 12 are arranged on the upside or the downside of the type-B battery cell 12. After being stacked together, the type-A battery cells 11 and the type-B battery cells 12 need to meet the requirements as following: the positive tab stacks and the negative tab stacks of the type-A battery cells 11 are psychically staggered and electrically isolated from the positive tab stacks and the negative tab stacks of the type-B battery cells 12; support frames 2 are arranged on the positive and the negative tabs and on the left and the right sides of the type-A battery cells 11, the support frames 2 separate the left and the right side surfaces of the type-A battery cells 11 from a corresponding type-A first connecting piece 111 and a corresponding type-A second connecting piece 112 respectively. It helps fix and reduce impacts on the tabs, so as to prevent the tabs from being broken by impacts generated during vibration.

In each battery module 1, the type-A battery cells 11 are connected in series and then their positive tabs and negative tabs are electrically connected with the type-A first connecting piece 111 and the type-A second connecting piece 112 respectively before accessing to a power bus. The type-B battery cells 12 in the battery module 1 are connected in series and then their positive tabs and negative tabs are electrically connected with a type-B first connecting piece 121 and a type-B second connecting piece 122 respectively before accessing to the power bus. The type-A first connecting piece 111 and the type-A second connecting piece 112 are physically separated and electrically isolated from each other. The type-B first connecting piece 121 and the type-B second connecting piece 122 are physically separated and electrically isolated from each other. The type-A first connecting piece 111 and the type-A second connecting piece 112 are psychically staggered and electrically isolated from the type-B first connecting piece 121 and the type-B second connecting piece 122. In the battery module 1, the type-B battery cells 12 are connected in series as well as the type-A battery cells 11. Then, the series connected type-B battery cells 11 are connected in series with DC/DC module and then connected in parallel with the series connected type-A battery cells 12. In the battery module 1, the type-A battery cells 11 and the type-B battery cells 12 correspond to different ECUs respectively. The information collected by all the ECUs is fed back to BMU, and BMU finally controls its discharging.

The type-A battery cell 11 is a kind of battery cell with flame retardant performance and high temperature working performance. In the embodiment, the type-A battery cell 11 may be ionic liquid battery cell, or solid electrolyte battery cell. The start-up temperature of the type-A battery cell 11 is higher than the type-B battery cell. The type-B battery cells 12 are electrically connected with each other as well as the type-A battery cells 11. Although two kinds of battery cells exist in one battery module 1 at the same time, the type-A battery cells 11 and the type-B battery cells 12 are merely physically contact with each other by arranging one or several type-A battery cells 11 between adjacent two type-B battery cells 12. The heat generated by the type-B battery cells 12 during charging and/or discharging can be absorbed by the type-A battery cells 11, which not only helps dissipate heat for the type-B battery cells 12 but also heat up the type-A battery cells 11 to an optimum working temperature. In one battery module 1, the two kinds of battery cells are electrically isolated from each other, and electrically connected with the corresponding connecting pieces respectively. Alternate arrangement of the type-B battery cells 12 and the several type-A battery cells 11 makes the type-B battery cells 12 be physically separated by the type-A battery cells 11, which have a flame retardation effect on the type-B battery cells 12 when burning or heating excessively. The amount ratio of the type-A battery cells 11 and the type-B battery cells 12 in a single battery module 1 is 1:2, which improves energy density of the battery pack.

In this embodiment, it will take a long time for the type-A battery cells 11 to reach the optimum working temperature if the temperature of the type-A battery cells 11 is only risen by the heat generated during charging and/or discharging of the type-B battery cells 12. Therefore, a heating device such as a film heater is arranged on the side surface of the type-A battery cell 11 where the type-A battery cell 11 don't contact with the type-B battery cell 12. All the film heaters are powered by the type-B battery cells 12 which reach the optimum working temperature earlier. Furthermore, the type-A battery cells 11 are arranged at both ends of the battery module 1, which makes the outermost two cells of the battery module 1 be type-A battery cells 11, to improve safety of the battery pack.

Embodiment 3

Figure 12:
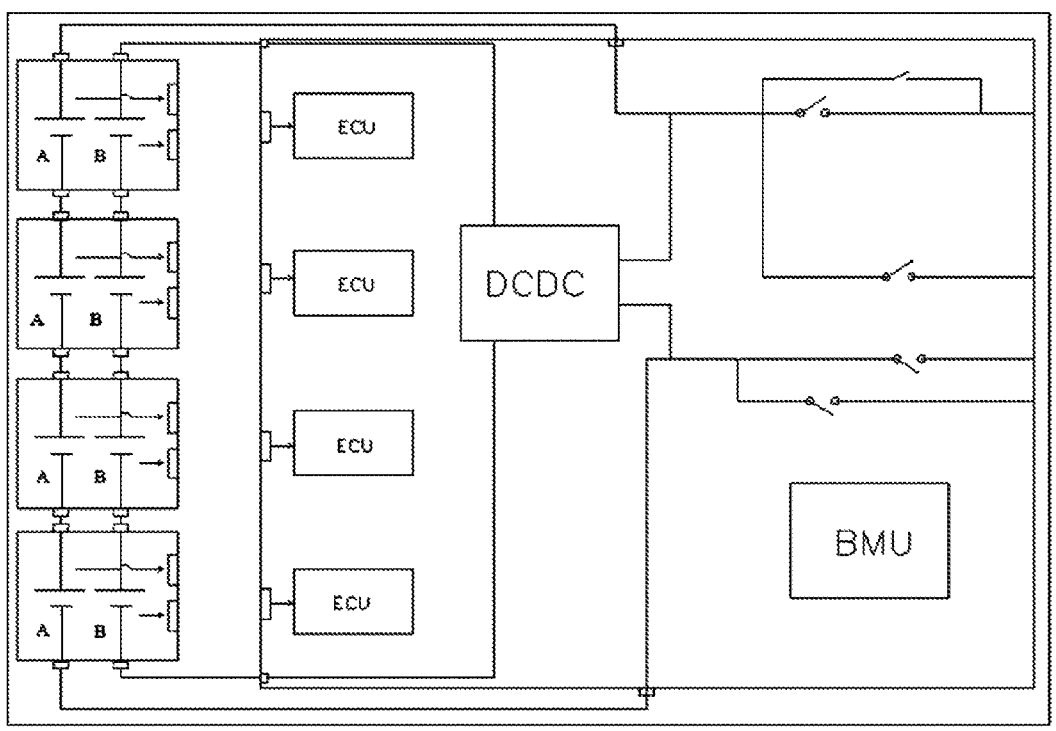
FIG. 12 is a schematic view of a circuit of the battery pack according to a third embodiment of the present invention.

Referring to FIG. 1 to FIG. 4b and FIG. 12, a battery pack of the present embodiment includes a plurality of battery modules 1. The battery modules 1 are connected in series. The battery module 1 includes a plurality of type-A battery cells 11 and a plurality of type-B battery cells 12. The type-A battery cell 11 has a positive tab and a negative tab, and the type-B battery cell 12 has a positive tab and a negative tab. The positive tab and the negative tab of the type-A battery cell 11 are arranged on the left side and the right side of the type-A battery cell 11 respectively, while the positive tab and the negative tab of the type-B battery cell 12 are arranged on the upside or the downside of the type-B battery cell 12. After being stacked together, the type-A battery cells 11 and the type-B battery cells 12 need to meet the requirements as following: the positive tab stacks and the negative tab stacks of the type-A battery cells 11 are psychically staggered and electrically isolated from the positive tab stacks and the negative tab stacks of the type-B battery cells 12; support frames 2 are arranged on the positive and the negative tabs and on the left and the right sides of the type-A battery cells 11, the support frames 2 separate the left and the right side surfaces of the type-A battery cells 11 from a corresponding type-A first connecting piece 111 and a corresponding type-A second connecting piece 112 respectively. It helps fix and reduce impacts on the tabs, so as to prevent the tabs from being broken by impacts generated during vibration.

In each battery module 1, the type-A battery cells 11 are connected in series and then their positive tabs and negative tabs are electrically connected with the type-A first connecting piece 111 and the type-A second connecting piece 112 respectively before accessing to a power bus. The type-B battery cells 12 in the battery module 1 are connected in series and then their positive tabs and negative tabs are electrically connected with a type-B first connecting piece 121 and a type-B second connecting piece 122 respectively before accessing to the power bus. The type-A first connecting piece 111 and the type-A second connecting piece 112 are physically separated and electrically isolated from each other. The type-B first connecting piece 121 and the type-B second connecting piece 122 are physically separated and electrically isolated from each other. The type-A first connecting piece 111 and the type-A second connecting piece 112 are psychically staggered and electrically isolated from the type-B first connecting piece 121 and the type-B second connecting piece 122. In the battery module 1, the type-B battery cells 12 are connected in series as well as the type-A battery cells 11. The type-A battery cells 11 are electrically isolated from the type-B battery cells 12 and the battery modules 1 are connected in series. The type-A battery cells 11 of different battery modules 1 are connected in series and the type-B battery cells 12 of different battery modules 1 are connected in series, too. All the type-A battery cells 11 in the battery pack need to connect with a voltage converter and then be connected in parallel before accessing to a power bus. This combination can meet the requirement of rapid charging electric vehicles. In the battery module 1, the type-A battery cells 11 and the type-B battery cells 12 correspond to different ECUs respectively. All the information collected by the ECUs is fed back to BMU, and BMU finally controls its discharging.

The type-A battery cell 11 is a kind of battery cell with flame retardant performance and high temperature working performance. In the embodiment, the type-A battery cell 11 may be ionic liquid battery cell, or solid electrolyte battery cell. The start-up temperature of the type-A battery cell 11 is higher than the type-B battery cell. The type-B battery cells 12 are electrically connected with each other as well as the type-A battery cells 11. Although two kinds of battery cells exist in one battery module 1 at the same time, the type-A battery cells 11 and the type-B battery cells 12 are merely physically contact with each other by arranging several type-A battery cells 11 between adjacent two type-B battery cells 12. The heat generated by the type-B battery cells 12 during charging and/or discharging can be absorbed by the type-A battery cells 11, which not only helps dissipate heat for the type-B battery cells 12 but also heat up the type-A battery cells 11 to an optimum working temperature. In one battery module 1, the two kinds of battery cells are electrically isolated from each other, and electrically connected with the corresponding connecting pieces respectively. Alternate arrangement of the type-B battery cells 12 and the several type-A battery cells 11 makes the type-B battery cells 12 be physically separated by the type-A battery cells 11, which have a flame retardation effect on the type-B battery cells 12 when burning or heating excessively. The amount ratio of the type-A battery cells 11 and the type-B battery cells 12 in a single battery module 1 is 3:1, which improves rapid charging and/or discharging capabilities of the battery pack. In this embodiment, it will take a long time for the type-A battery cells 11 to reach the optimum working temperature if the temperature of the type-A battery cells 11 is only risen by the heat generated during charging and/or discharging of the type-B battery cells 12. Therefore, a heating device such as a film heater is arranged on the side surface of the type-A battery cell 11 where the type-A battery cell 11 don't contact with the type-B battery cell 12. All the film heaters are powered by the type-B battery cells 12 which reach the optimum working temperature earlier. Furthermore, the type-A battery cells 11 are arranged at both ends of the battery module 1, which makes the outermost two cells of the battery module 1 be type-A battery cells 11, to improve safety of the battery pack.

Embodiment 4

Figure 5A:
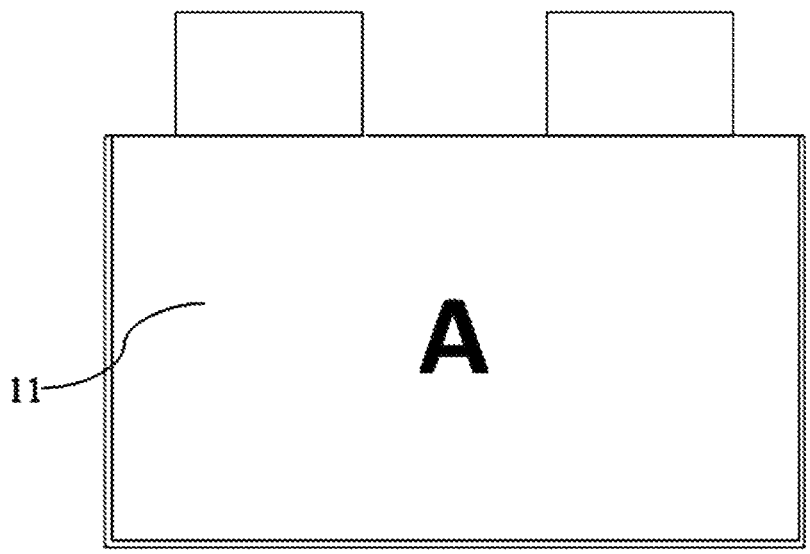
FIGS. 5a and 5b are schematic views of type-A and type-B battery cells according to a second embodiment of the present invention.
Figure 5B:
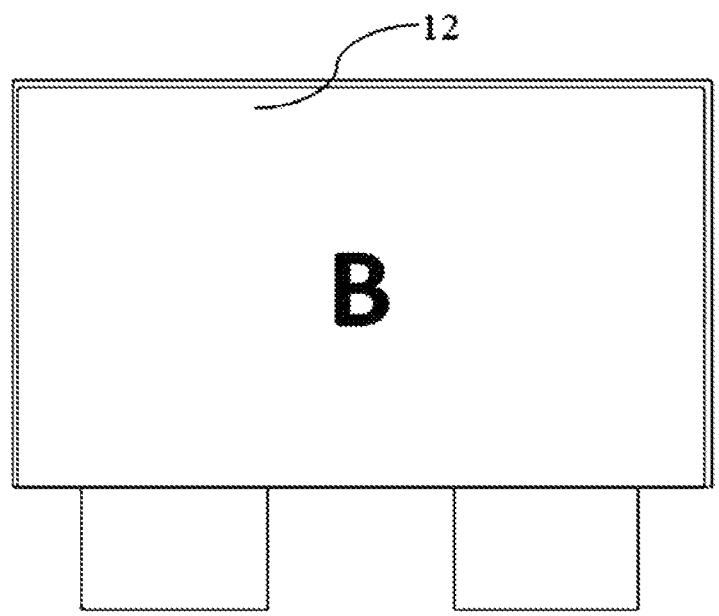

Referring to FIG. 3, FIGS. 5a, 5b and 10, by referring to the syntagmatic relationship between the type-A battery cells and the type-B battery cells in embodiment 1, a battery pack of the present embodiment includes a plurality of battery modules 1. The battery modules 1 are connected in parallel. The battery module 1 includes a plurality of type-A battery cells 11 and a plurality of type-B battery cells 12. The type-A battery cell 11 has a positive tab and a negative tab, and the type-B battery cell 12 has a positive tab and a negative tab. The positive tab and the negative tab of the type-A battery cell 11 are arranged on the upside or the downside of the type-A battery cell 11, while the positive tab and the negative tab of the type-B battery cell 12 are arranged on the upside or the downside of the type-B battery cell 12. The type-A battery cells 11 and the type-B battery cells 12 are arranged in an inverted manner along up-down direction. This makes the upside and the downside of the type-A battery cells 11 correspond and adjacent to the downside and the upside of the type-B battery cells 12 respectively. After being stacked together, the type-A battery cells 11 and the type-B battery cells 12 need to meet the requirements as following: the positive tab stacks and the negative tab stacks of the type-A battery cells 11 are psychically staggered and electrically isolated from the positive tab stacks and the negative tab stacks of the type-B battery cells 12; the type-A battery cells 11 in each battery module 1 are connected in parallel and then their positive tabs and negative tabs are electrically connected with a type-A first connecting piece 111 and a type-A second connecting piece 112 respectively before accessing to a power bus; the type-B battery cells 12 in each battery module 1 are connected in parallel and then their positive tabs and negative tabs are electrically connected with a type-B first connecting piece 121 and a type-B second connecting piece 122 respectively before accessing to the power bus; the type-A first connecting piece 111 and the type-A second connecting piece 112 are physically separated and electrically isolated from each other; the type-B first connecting piece 121 and the type-B second connecting piece 122 are physically separated and electrically isolated from each other; the type-A first connecting piece 111 and the type-A second connecting piece 112 are psychically staggered and electrically isolated from the type-B first connecting piece 121 and the type-B second connecting piece 122; the type-B battery cells 12 in the battery module 1 are connected in parallel as well as the type-A battery cells 11; the parallel connected type-A battery cells 11 are connected in series with the parallel connected type-B battery cells 12; the type-A battery cells 11 and the type-B battery cells 12 in the battery module 1 correspond to different ECUs respectively; all the information collected by the ECUs is fed back to BMU, and BMU finally controls its discharging.

The type-A battery cell 11 is a kind of battery cell with flame retardant performance and high temperature working performance. In the embodiment, the type-A battery cell 11 may be ionic liquid battery cell, or solid electrolyte battery cell. The start-up temperature of the type-A battery cell 11 is higher than the type-B battery cell. The type-B battery cells 12 are electrically connected with each other as well as the type-A battery cells 11. Although two kinds of battery cells exist in one battery module 1 at the same time, the type-A battery cells 11 and the type-B battery cells 12 are merely physically contact with each other by arranging several type-A battery cells 11 between adjacent two type-B battery cells 12. The heat generated by the type-B battery cells 12 during charging and/or discharging can be absorbed by the type-A battery cells 11, which not only helps dissipate heat for the type-B battery cells 12 but also heat up the type-A battery cells 11 to an optimum working temperature. In one battery module 1, the two kinds of battery cells are electrically isolated from each other, and electrically connected with the corresponding connecting pieces respectively. Alternate arrangement of the type-B battery cells 12 and the several type-A battery cells 11 makes the type-B battery cells 12 be physically separated by the type-A battery cells 11, which have a flame retardation effect on the type-B battery cells 12 when burning or heating excessively. The amount ratio of the type-A battery cells 11 and the type-B battery cells 12 in a single battery module 1 is 3:1, which improves energy density of the battery pack.

In this embodiment, it will take a long time for the type-A battery cells 11 to reach the optimum working temperature if the temperature of the type-A battery cells 11 is only risen by the heat generated during charging and/or discharging of the type-B battery cells 12. Therefore, a heating device such as a film heater is arranged on the side surface of the type-A battery cell 11 where the type-A battery cell 11 don't contact with the type-B battery cell 12. All the film heaters are powered by the type-B battery cells 12 which reach the optimum working temperature earlier. Furthermore, the type-A battery cells 11 are arranged at both ends of the battery module 1, which makes the outermost two cells of the battery module 1 be type-A battery cells 11, to improve safety of the battery pack.

Embodiment 5

Figure 6A:
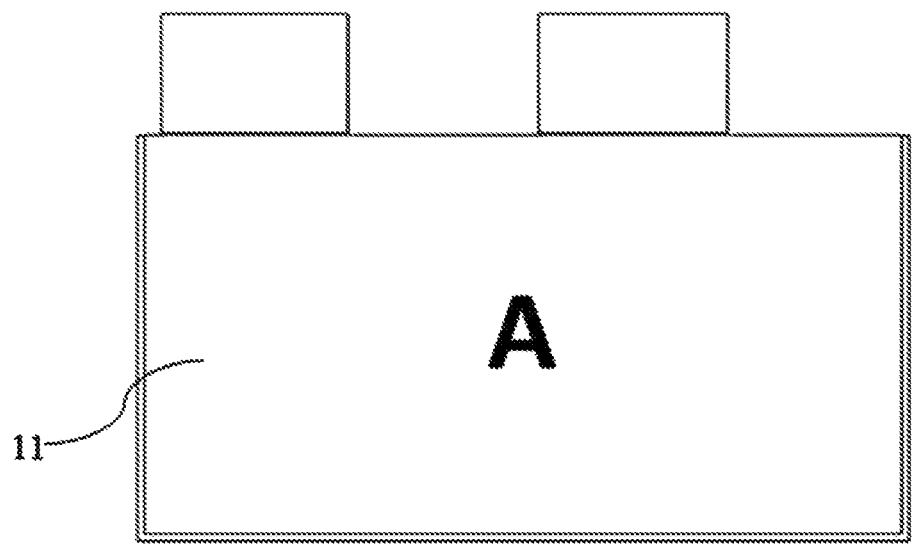
FIGS. 6a and 6b are schematic views of type-A and type-B battery cells according to a third embodiment of the present invention.
Figure 6B:
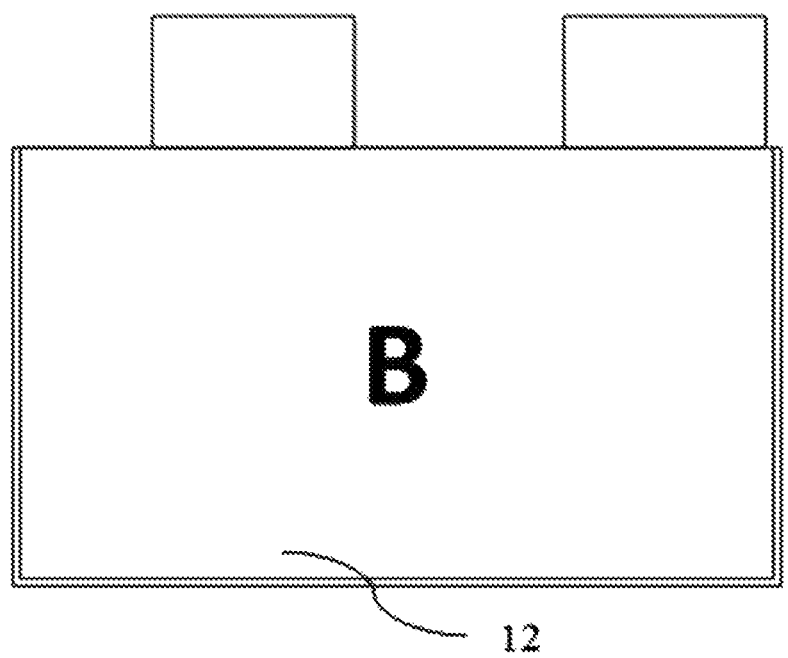

Referring to FIG. 3, FIGS. 6a, 6b and 10, by referring to the syntagmatic relationship between the type-A battery cells and the type-B battery cells in embodiment 1, a battery pack of the present embodiment includes a plurality of battery modules 1. The battery modules 1 are connected in parallel. The battery module 1 includes a plurality of type-A battery cells 11 and a plurality of type-B battery cells 12. The type-A battery cell 11 has a positive tab and a negative tab, and the type-B battery cell 12 has a positive tab and a negative tab. The positive tab and the negative tab of the type-A battery cell 11 are respectively arranged on the upside or the downside of the type-A battery cell 11, while the positive tab and the negative tab of the type-B battery cell 12 are arranged on the upside or the downside of the type-B battery cell 12. The positive tab and the negative tab of the type-A battery cells 11 are staggered from the positive tab and the negative tab of the type-B battery cells 12. That is, the projections of the positive tab and the negative tab of the type-B battery cells 12 on the type-A battery cells 11 are staggered from the positive tab and the negative tab of the type-A battery cells 11. After being stacked together, the type-A battery cells 11 and the type-B battery cells 12 need to meet the requirements as following: the positive tab stacks and the negative tab stacks of the type-A battery cells 11 are psychically staggered and electrically isolated from the positive tab stacks and the negative tab stacks of the type-B battery cells 12.

The type-A battery cells 11 in each battery module 1 are connected in parallel and then their positive tabs and negative tabs are electrically connected with a type-A first connecting piece 111 and a type-A second connecting piece 112 respectively before accessing to a power bus. The type-B battery cells 12 in each battery module 1 are connected in parallel and then their positive tabs and negative tabs are electrically connected with a type-B first connecting piece 121 and a type-B second connecting piece 122 respectively before accessing to the power bus. The type-A first connecting piece 111 and the type-A second connecting piece 112 are physically separated and electrically isolated from each other. The type-B first connecting piece 121 and the type-B second connecting piece 122 are physically separated and electrically isolated from each other. The type-A first connecting piece 111 and the type-A second connecting piece 112 are physically staggered and electrically isolated from the type-B first connecting piece 121 and the type-B second connecting piece 122. The type-B battery cells 12 in the battery module 1 are connected in parallel as well as the type-A battery cells 11. The parallel connected type-A battery cells 11 are connected in series with the parallel connected type-B battery cells 12. The type-A battery cells 11 and the type-B battery cells 12 in the battery module 1 correspond to different ECUs respectively. All the information collected by the ECUs is fed back to BMU, and BMU finally controls its discharging.

The type-A battery cell 11 is a kind of battery cell with flame retardant performance and high temperature working performance. In the embodiment, the type-A battery cell 11 may be ionic liquid battery cell, or solid electrolyte battery cell. The start-up temperature of the type-A battery cell 11 is higher than the type-B battery cell. The type-B battery cells 12 are electrically connected with each other as well as the type-A battery cells 11. Although two kinds of battery cells exist in one battery module 1 at the same time, the type-A battery cells 11 and the type-B battery cells 12 are merely physically contact with each other by arranging several type-A battery cells 11 between adjacent two type-B battery cells 12. The heat generated by the type-B battery cells 12 during charging and/or discharging can be absorbed by the type-A battery cells 11, which not only helps dissipate heat for the type-B battery cells 12 but also heat up the type-A battery cells 11 to an optimum working temperature. In one battery module 1, the two kinds of battery cells are electrically isolated from each other, and electrically connected with the corresponding connecting pieces respectively. Alternate arrangement of the type-B battery cells 12 and the several type-A batter battery cells 11 makes the type-B battery cells 12 be physically separated by the type-A battery cells 11, which have a flame retardation effect on the type-B battery cells 12 when burning or heating excessively. The amount ratio of the type-A battery cells 11 and the type-B battery cells 12 in a single battery module 1 is 3:1, which improves energy density of the battery pack.

In this embodiment, it will take a long time for the type-A battery cells 11 to reach the optimum working temperature if the temperature of the type-A battery cells 11 is only risen by the heat generated during charging and/or discharging of the type-B battery cells 12. Therefore, a heating device such as a film heater is arranged on the side surface of the type-A battery cell 11 where the type-A battery cell 11 don't contact with the type-B battery cell 12. All the film heaters are powered by the type-B battery cells 12 which reach the optimum working temperature earlier. Furthermore, the type-A battery cells 11 are arranged at both ends of the battery module 1, which makes the outermost two cells of the battery module 1 be type-A battery cells 11, to improve safety of the battery pack.

Embodiment 6

Figure 7A:
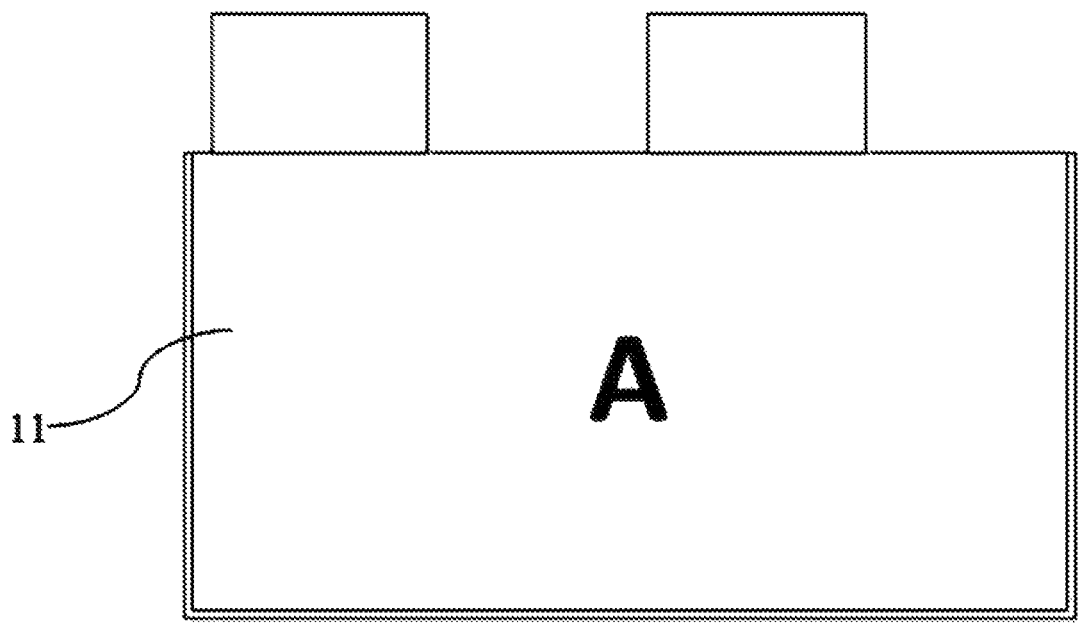
FIGS. 7a and 7b are schematic views of type-A and type-B battery cells according to a fourth embodiment of the present invention.
Figure 7B:
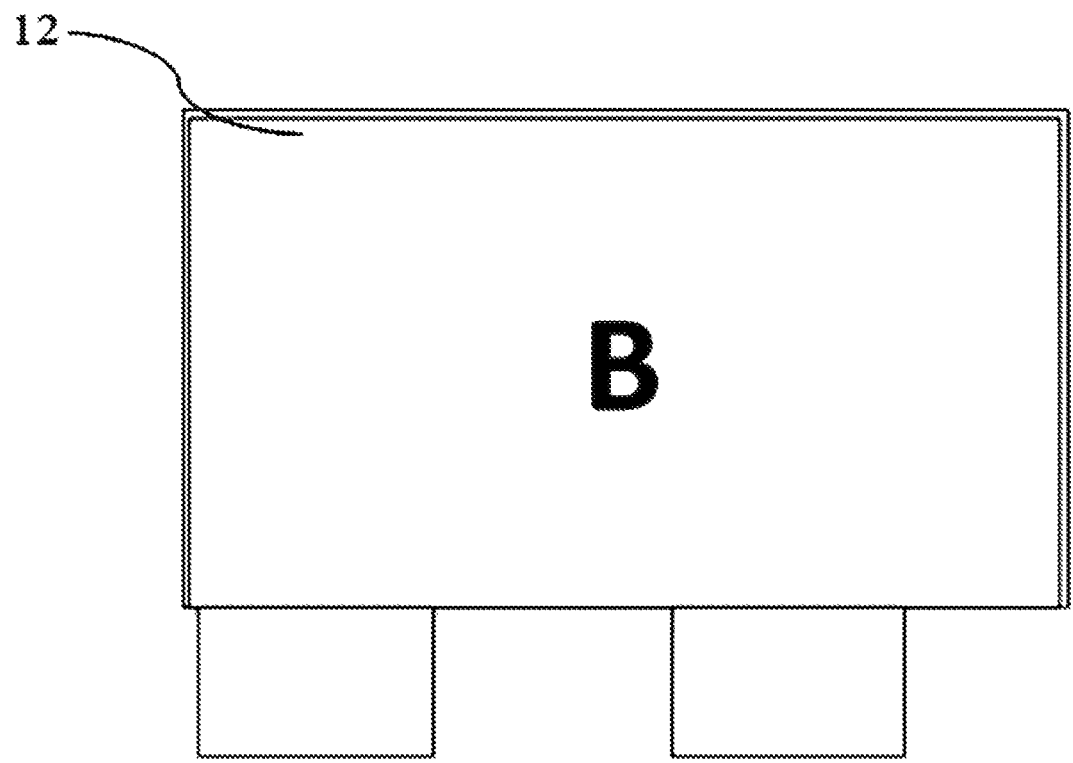

Referring to FIG. 3, FIGS. 7a, 7b and 10, by referring to the syntagmatic relationship between the type-A battery cells and the type-B battery cells in embodiment 1, a battery pack of the present embodiment includes a plurality of battery modules 1. The battery modules 1 are connected in parallel. The battery module 1 includes a plurality of type-A battery cells 11 and a plurality of type-B battery cells 12. The type-A battery cell 11 has a positive tab and a negative tab, and the type-B battery cell 12 has a positive tab and a negative tab. The positive tab and the negative tab of the type-A battery cell 11 are arranged on the upside or the downside of the type-A battery cell 11 respectively, while the positive tab and the negative tab of the type-B battery cell 12 are arranged on the upside or the downside of the type-B battery cell 12. The positive tab and the negative tab of the type-A battery cells 11 are staggered from the positive tab and the negative tab of the type-B battery cells 12, and the type-A battery cells 11 and the type-B battery cells 12 are arranged in an inverted manner along up-down direction. After being stacked together, the type-A battery cells 11 and the type-B battery cells 12 need to meet the requirements as following: the positive tab stacks and the negative tab stacks of the type-A battery cells 11 are psychically staggered and electrically isolated from the positive tab stacks and the negative tab stacks of the type-B battery cells 12.

The type-A battery cells 11 in each battery module 1 are connected in parallel and then their positive tabs and negative tabs are electrically connected with a type-A first connecting piece 111 and a type-A second connecting piece 112 respectively before accessing to a power bus. The type-B battery cells 12 in each battery module 1 are connected in parallel and then their positive tabs and negative tabs are electrically connected with a type-B first connecting piece 121 and a type-B second connecting piece 122 respectively before accessing to the power bus. The type-A first connecting piece 111 and the type-A second connecting piece 112 are physically separated and electrically isolated from each other. The type-B first connecting piece 121 and the type-B second connecting piece 122 are physically separated and electrically isolated from each other. The type-A first connecting piece 111 and the type-A second connecting piece 112 are physically staggered and electrically isolated from the type-B first connecting piece 121 and the type-B second connecting piece 122. The type-B battery cells 12 in the battery module 1 are connected in parallel as well as the type-A battery cells 11. The parallel connected type-A battery cells 11 are connected in series with the parallel connected type-B battery cells 12. The type-A battery cells 11 and the type-B battery cells 12 in the battery module 1 correspond to different ECUs respectively. All the information collected by the ECUs is fed back to BMU, and BMU finally controls its discharging.

The type-A battery cell 11 is a kind of battery cell with flame retardant performance and high temperature working performance. In the embodiment, the type-A battery cell 11 may be ionic liquid battery cell, or solid electrolyte battery cell. The start-up temperature of the type-A battery cell 11 is higher than the type-B battery cell. The type-B battery cells 12 are electrically connected with each other as well as the type-A battery cells 11. Although two kinds of battery cells exist in one battery module 1 at the same time, the type-A battery cells 11 and the type-B battery cells 12 are merely physically contact with each other by arranging several type-A battery cells 11 between adjacent two type-B battery cells 12. The heat generated by the type-B battery cells 12 during charging and/or discharging can be absorbed by the type-A battery cells 11, which not only helps dissipate heat for the type-B battery cells 12 but also heat up the type-A battery cells 11 to an optimum working temperature. In one battery module 1, the two kinds of battery cells are electrically isolated from each other, and electrically connected with the corresponding connecting pieces respectively. Alternate arrangement of the type-B battery cells 12 and the several type-A battery cells 11 makes the type-B battery cells 12 be physically separated by the type-A battery cells 11, which have a flame retardation effect on the type-B battery cells 12 when burning or heating excessively. The amount ratio of the type-A battery cells 11 and the type-B battery cells 12 in a single battery module 1 is 3:1, which improves energy density of the battery pack.

In this embodiment, it will take a long time for the type-A battery cells 11 to reach the optimum working temperature if the temperature of the type-A battery cells 11 is only risen by the heat generated during charging and/or discharging of the type-B battery cells 12. Therefore, a heating device such as a film heater is arranged on the side surface of the type-A battery cell 11 where the type-A battery cell 11 don't contact with the type-B battery cell 12. All the film heaters are powered by the type-B battery cells 12 which reach the optimum working temperature earlier. Furthermore, the type-A battery cells 11 are arranged at both ends of the battery module 1, which makes the outermost two cells of the battery module 1 be type-A battery cells 11, to improve safety of the battery pack.

Embodiment 7

Figure 8A:
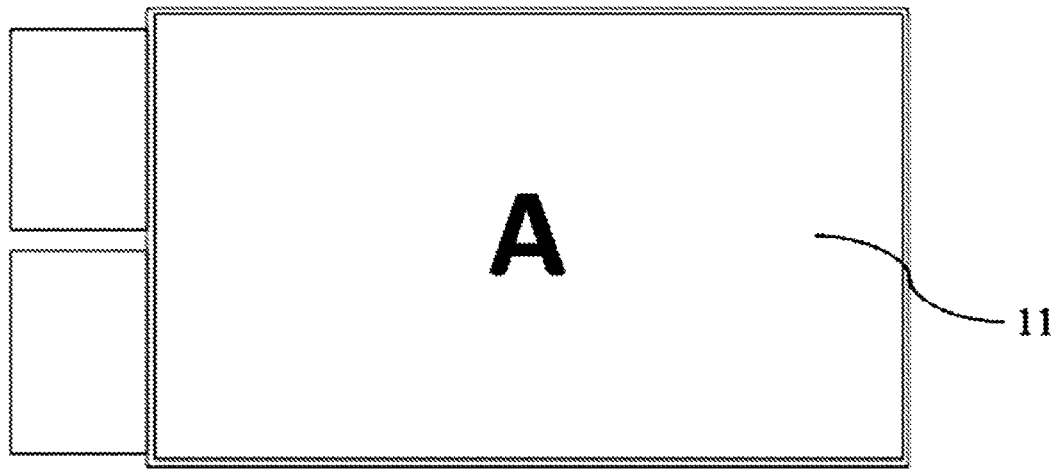
FIGS. 8a and 8b are schematic views of type-A and type-B battery cells according to a fifth embodiment of the present invention.
Figure 8B:
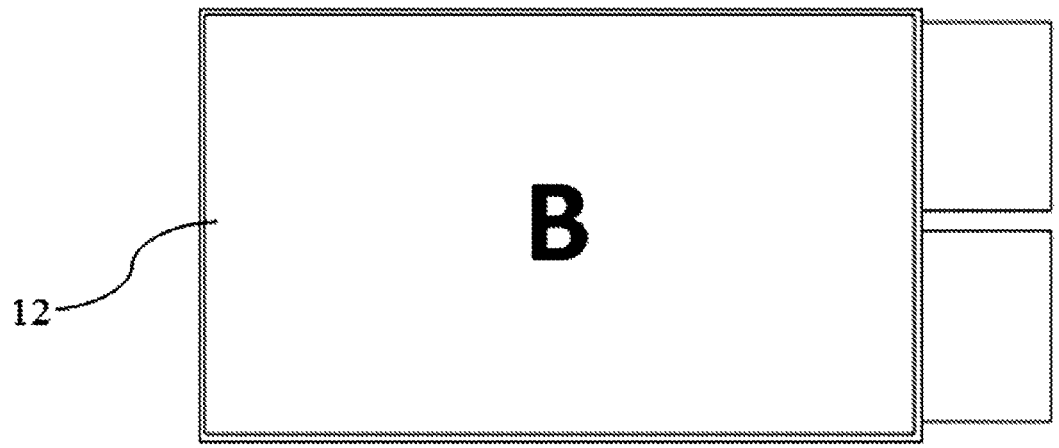

Referring to FIG. 3, FIGS. 8a, 8b and 10, by referring to the syntagmatic relationship between the type-A battery cells and the type-B battery cells in embodiment 1, a battery pack of the present embodiment includes a plurality of battery modules 1. The battery modules 1 are connected in parallel. The battery module 1 includes a plurality of type-A battery cells 11 and a plurality of type-B battery cells 12. The type-A battery cell 11 has a positive tab and a negative tab, and the type-B battery cell 12 has a positive tab and a negative tab. The positive tab and the negative tab of the type-A battery cell 11 are arranged on the left side or the right side of the type-A battery cell 11 respectively, while the positive tab and the negative tab of the type-B battery cell 12 are arranged on the left side or the right side of the type-B battery cell 12. The type-A battery cells 11 and the type-B battery cells 12 are arranged in an inverted manner along left-right direction. This makes the left side and the right side of the type-A battery cells 11 correspond and adjacent to the right side and the left side of the type-B battery cells 12 respectively, and further makes the positive tab and the negative tab of the type-A battery cells 11 and the positive tab and the negative tab of the type-B battery cells 12 be arranged at different sides of the battery module 1. After being stacked together, the type-A battery cells 11 and the type-B battery cells 12 need to meet the requirements as following: the positive tab stacks and the negative tab stacks of the type-A battery cells 11 are psychically staggered and electrically isolated from the positive tab stacks and the negative tab stacks of the type-B battery cells 12. Support frames 2 are arranged on the positive and the negative tabs of the type-A battery cells 11 and the type-B battery cells 12 and on the left or the right side of the battery module 1. The support frames 2 separate the side surfaces of the type-A battery cells 11 from a corresponding type-A first connecting piece 111 and a corresponding second connecting piece 112, and in the same way, the support frames 2 separate the side surfaces of the type-B battery cells 12 from a corresponding type-B first connecting piece 121 and a corresponding second connecting piece 122. The support frames 2 being disposed between the side surfaces of the battery cells and the corresponding connecting pieces helps to contribute stability of the tabs. The support frames 2 can help to fix and buffer shocks on the tabs even when the battery pack endure vibration.

The type-A battery cells 11 in each battery module 1 are connected in parallel and then their positive tabs and negative tabs are electrically connected with the type-A first connecting piece 111 and the type-A second connecting piece 112 respectively before accessing to a power bus. The type-B battery cells 12 in each battery module 1 are connected in parallel and then their positive tabs and negative tabs are electrically connected with the type-B first connecting piece 121 and the type-B second connecting piece 122 respectively before accessing to the power bus. The type-A first connecting piece 111 and the type-A second connecting piece 112 are physically separated and electrically isolated from each other. The type-B first connecting piece 121 and the type-B second connecting piece 122 are physically separated and electrically isolated from each other. The type-A first connecting piece 111 and the type-A second connecting piece 112 are physically staggered and electrically isolated from the type-B first connecting piece 121 and the type-B second connecting piece 122. The type-B battery cells 12 in the battery module 1 are connected in parallel as well as the type-A battery cells 11. The parallel connected type-A battery cells 11 are connected in series with the parallel connected type-B battery cells 12. The type-A battery cells 11 and the type-B battery cells 12 in the battery module 1 correspond to different ECUs respectively. All the information collected by the ECUs is fed back to BMU, and BMU finally controls its discharging.

The type-A battery cell 11 is a kind of battery cell with flame retardant performance and high temperature working performance. In the embodiment, the type-A battery cell 11 may be ionic liquid battery cell, or solid electrolyte battery cell. The start-up temperature of the type-A battery cell 11 is higher than the type-B battery cell. The type-B battery cells 12 are electrically connected with each other as well as the type-A battery cells 11. Although two kinds of battery cells exist in one battery module 1 at the same time, the type-A battery cells 11 and the type-B battery cells 12 are merely physically contact with each other by arranging several type-A battery cells 11 between adjacent two type-B battery cells 12. The heat generated by the type-B battery cells 12 during charging and/or discharging can be absorbed by the type-A battery cells 11, which not only helps dissipate heat for the type-B battery cells 12 but also heat up the type-A battery cells 11 to an optimum working temperature. In one battery module 1, the two kinds of battery cells are electrically isolated from each other, and electrically connected with the corresponding connecting pieces respectively. Alternate arrangement of the type-B battery cells 12 and the several type-A battery cells 11 makes the type-B battery cells 12 be physically separated by the type-A battery cells 11, which have a flame retardation effect on the type-B battery cells 12 when burning or heating excessively. The amount ratio of the type-A battery cells 11 and the type-B battery cells 12 in a single battery module 1 is 3:1, which improves energy density of the battery pack.

In this embodiment, it will take a long time for the type-A battery cells 11 to reach the optimum working temperature if the temperature of the type-A battery cells 11 is only risen by the heat generated during charging and/or discharging of the type-B battery cells 12. Therefore, a heating device such as a film heater is arranged on the side surface of the type-A battery cell 11 where the type-A battery cell 11 don't contact with the type-B battery cell 12. All the film heaters are powered by the type-B battery cells 12 which reach the optimum working temperature earlier. Furthermore, the type-A battery cells 11 are arranged at both ends of the battery module 1, which makes the outermost two cells of the battery module 1 be type-A battery cells 11, to improve safety of the battery pack.

Embodiment 8

Figure 9A:
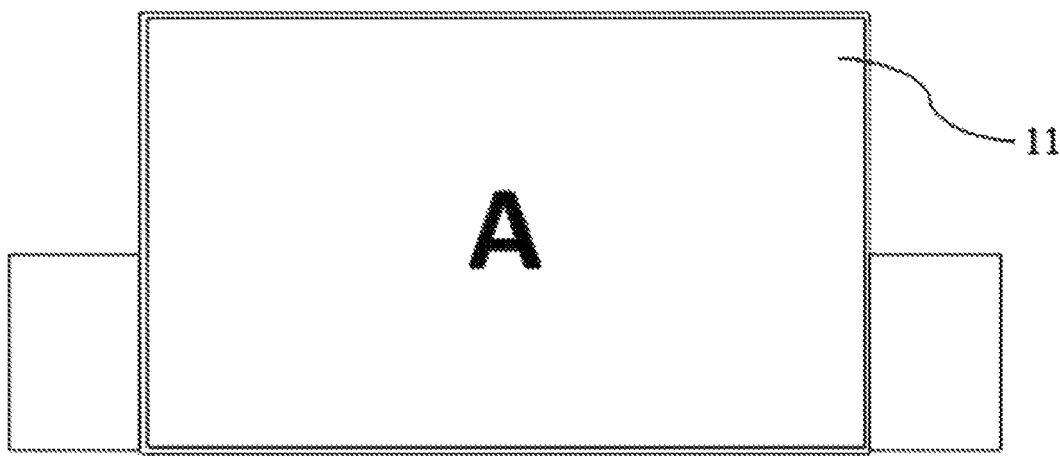
FIGS. 9a and 9b are schematic views of type-A and type-B battery cells according to a sixth embodiment of the present invention.
Figure 9B:
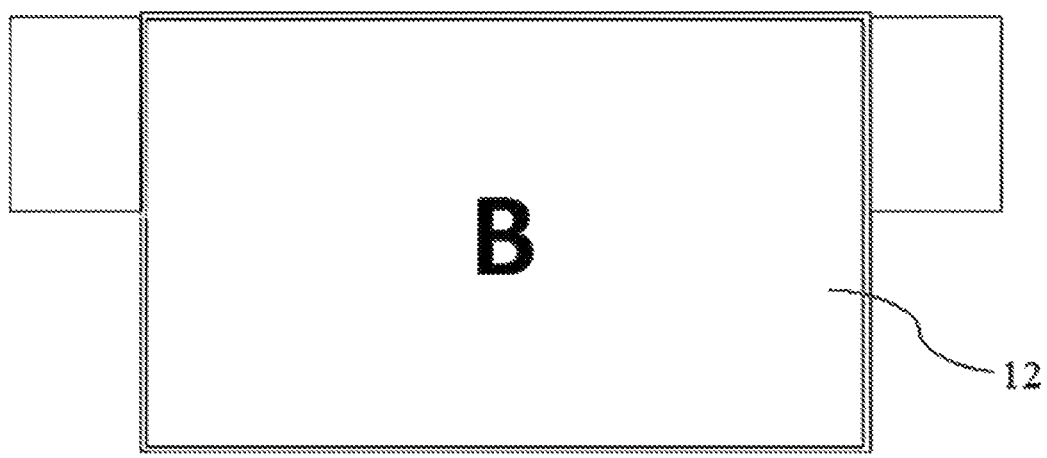

Referring to FIG. 3, FIGS. 9a, 9b and 10, by referring to the syntagmatic relationship between the type-A battery cells and the type-B battery cells in embodiment 1, a battery pack of the present embodiment includes a plurality of battery modules 1. The battery modules 1 are connected in parallel. The battery module 1 includes a plurality of type-A battery cells 11 and a plurality of type-B battery cells 12. The type-A battery cell 11 has a positive tab and a negative tab, and the type-B battery cell 12 has a positive tab and a negative tab. The positive tab and the negative tab of the type-A battery cell 11 are arranged on the left side and the right side of the type-A battery cell 11 respectively, while the positive tab and the negative tab of the type-B battery cell 12 are arranged on the left side and the right side of the type-B battery cell 12 respectively. The positive tab and the negative tab of the type-A battery cells 11 are staggered from the positive tab and the negative tab of the type-B battery cells 12. After being stacked together, the type-A battery cells 11 and the type-B battery cells 12 need to meet the requirements as following: the positive tab stacks and the negative tab stacks of the type-A battery cells 11 are psychically staggered and electrically isolated from the positive tab stacks and the negative tab stacks of the type-B battery cells 12. Support frames 2 are arranged on the positive and the negative tabs and on the left and the right sides of the type-A battery cells 11 and the type-B battery cells 12. The support frames 2 separate the side surfaces of the type-A battery cells 11 from a corresponding type-A first connecting piece 111 and a corresponding second connecting piece 112, and separate the side surfaces of the type-B battery cells 12 from a corresponding type-B first connecting piece 121 and a corresponding second connecting piece 122 in the same way. If the tabs are arranged on the left and the right side surfaces of a battery cell, they may be broken by vibration generated during the operation of the battery pack. It contributes to the stability of tabs by arranging support frames 2 between the connecting pieces and the side surfaces of the corresponding battery cells. Even though vibration occurs in the battery pack, the support frames can play the role of fixing and buffering.

The type-A battery cells 11 in each battery module 1 are connected in parallel and then their positive tabs and negative tabs are electrically connected with the type-A first connecting piece 111 and the type-A second connecting piece 112 respectively before accessing to a power bus. The type-B battery cells 12 in each battery module 1 are connected in parallel and then their positive tabs and negative tabs are electrically connected with the type-B first connecting piece 121 and the type-B second connecting piece 122 respectively before accessing to the power bus. The type-A first connecting piece 111 and the type-A second connecting piece 112 are physically separated and electrically isolated from each other. The type-B first connecting piece 121 and the type-B second connecting piece 122 are physically separated and electrically isolated from each other. The type-A first connecting piece 111 and the type-A second connecting piece 112 are physically staggered and electrically isolated from the type-B first connecting piece 121 and the type-B second connecting piece 122. The type-B battery cells 12 in the battery module 1 are connected in parallel as well as the type-A battery cells 11. The parallel connected type-A battery cells 11 are connected in series with the parallel connected type-B battery cells 12. The type-A battery cells 11 and the type-B battery cells 12 in the battery module 1 correspond to different ECUs respectively. All the information collected by the ECUs is fed back to BMU, and BMU finally controls its discharging.

The type-A battery cell 11 is a kind of battery cell with flame retardant performance and high temperature working performance. In the embodiment, the type-A battery cell 11 may be ionic liquid battery cell, or solid electrolyte battery cell. The start-up temperature of the type-A battery cell 11 is higher than the type-B battery cell. The type-B battery cells 12 are electrically connected with each other as well as the type-A battery cells 11. Although two kinds of battery cells exist in one battery module 1 at the same time, the type-A battery cells 11 and the type-B battery cells 12 are merely physically contact with each other by arranging several type-A battery cells 11 between adjacent two type-B battery cells 12. The heat generated by the type-B battery cells 12 during charging and/or discharging can be absorbed by the type-A battery cells 11, which not only helps dissipate heat for the type-B battery cells 12 but also heat up the type-A battery cells 11 to an optimum working temperature. In one battery module 1, the two kinds of battery cells are electrically isolated from each other, and electrically connected with the corresponding connecting pieces respectively. Alternate arrangement of the type-B battery cells 12 and the several type-A battery cells 11 makes the type-B battery cells 12 be physically separated by the type-A battery cells 11, which have a flame retardation effect on the type-B battery cells 12 when burning or heating excessively. The amount ratio of the type-A battery cells 11 and the type-B battery cells 12 in a single battery module 1 is 3:1, which improves energy density of the battery pack.

In this embodiment, it will take a long time for the type-A battery cells 11 to reach the optimum working temperature if the temperature of the type-A battery cells 11 is only risen by the heat generated during charging and/or discharging of the type-B battery cells 12. Therefore, a heating device such as a film heater is arranged on the side surface of the type-A battery cell 11 where the type-A battery cell 11 don't contact with the type-B battery cell 12. All the film heaters are powered by the type-B battery cells 12 which reach the optimum working temperature earlier. Furthermore, the type-A battery cells 11 are arranged at both ends of the battery module 1, which makes the outermost two cells of the battery module 1 be type-A battery cells 11, to improve safety of the battery pack.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A battery pack, comprising: a plurality of electrically connected battery modules, wherein the battery module comprises a plurality of battery cells A and a plurality of battery cells B, the battery cells A are of flame retardant performance, and a start-up temperature of the battery cells A is higher than that of the battery cells B, the battery cells A and the battery cells B are arranged in an alternate manner, the battery cells A each has a positive tab and a negative tab, the battery cells B each has a positive tab and a negative tab, the positive tabs of the battery cells A of the battery module are stacked in one group and electrically connected with a first connecting piece A, the negative tabs of the battery cells A of the battery module are stacked in one group and electrically connected with a second connecting piece A, the positive tabs of the battery cells B of the battery module are stacked in one group and electrically connected with a first connecting piece B, the negative tabs of the battery cells B of the battery module are stacked in one group and electrically connected with a second connecting piece B, the first connecting piece A and the second connecting piece A are staggered and electrically isolated from the first connecting piece B and the second connecting piece B.

2. The battery pack according to claim 1, wherein the battery cells A in the battery module are connected in parallel, the battery cells B in the battery module are connected in parallel, the parallel connected battery cells A are connected in series with the parallel connected battery cells B, and the battery modules are connected in parallel.

3. The battery pack according to claim 1, wherein the battery cells A in the battery module are connected in series, the battery cells B in the battery module are connected in series, the series connected battery cells A are connected in parallel with the series connected battery cells B, and the battery modules are connected in parallel.

4. The battery pack according to claim 1, wherein the battery cells A in the battery module are connected in series, the battery cells B in the battery module are connected in series, the battery cells A are electrically isolated from the battery cells B, the battery modules are connected in series, the battery cells A in different battery modules are connected in series, and the battery cells B in different battery modules are connected in series.

5. The battery pack according to claim 1, wherein the battery cells A comprise ionic liquid electrolyte battery cells and/or solid electrolyte battery cells.

6. The battery pack according to claim 1, wherein support frames are arranged on a side where the positive tabs and the negative tabs of the battery cells A are disposed, support frames are arranged on a side where the positive tabs and the negative tabs of the battery cells B are disposed, the support frames are disposed between the positive tabs or the negative tabs of the battery cells A or the battery cells B and a corresponding connecting piece.

7. The battery pack according to claim 1, wherein a heating device is arranged to the battery cells A on a side surface which is not in contact with the battery cells B.

8. The battery pack according to claim 1, wherein the battery cells A are arranged at both ends of the battery module.

9. The battery pack according to claim 1, wherein the positive and the negative tabs of the battery cells A are arranged on upside or downside of the battery cells A, the positive and the negative tabs of the battery cells B are arranged on left side and/or right side of the battery cells B.

10. The battery pack according to claim 1, wherein the positive and the negative tabs of the battery cells A are arranged on upside or downside of the battery cells A, the positive and the negative tabs of the battery cells B are arranged on upside or downside of the battery cells B, the battery cells A and the battery cells B are arranged in an inverted manner along up-down direction.

11. The battery pack according to claim 1, wherein the positive and the negative tabs of the battery cells A are arranged on upside or downside of the battery cells A, the positive and the negative tabs of the battery cells B are arranged on upside or downside of the battery cells B, the positive and the negative tabs of the battery cells A stagger from the positive and the negative tabs of the battery cells B, after being stacked together, a positive tab stack and a negative tab stack of the battery cells A are electrically isolated from a positive tab stack and a negative tab stack of the battery cells B.

12. The battery pack according to claim 1, wherein the positive and the negative tabs of the battery cells A are arranged on left or right side of the battery cells A, the positive and the negative tabs of the battery cells B are arranged on left or right side of the battery cells B, the battery cells A and the battery cells B are arranged in an inverted manner along left-right direction.

13. The battery pack according to claim 1, wherein the positive and the negative tabs of the battery cells A are arranged on left side and right side of the battery cells A respectively, the positive and the negative tabs of the battery cells B are arranged on left side and right side of the battery cells B respectively, the positive and the negative tabs of the battery cells A are staggered from the positive and the negative tabs of the battery cells B, after being stacked together, a positive tab stack of the battery cells A is electrically isolated from a positive tab stack of the battery cells B and a negative tab stack of the battery cells A is electrically isolated from a negative tab stack of the battery cells B.

14. A battery pack, comprising: a plurality of electrically connected battery modules, wherein the battery module comprises a plurality of battery cells A and a plurality of battery cells B, the battery cells A are of flame retardant performance, and a start-up temperature of the battery cells A is higher than that of the battery cells B, the battery cells A and the battery cells B are arranged in an alternate manner, the battery cells A each has a positive tab and a negative tab, the battery cells B each has a positive tab and a negative tab, the positive tabs of the battery cells A of the battery module are disposed at the same side of the battery module and electrically connected with one first connecting piece A, the negative tabs of the battery cells A of the battery module are disposed at the same side of the battery module and electrically connected with one second connecting piece A, the positive tabs of the battery cells B of the battery module are disposed at the same side of the battery module and electrically connected with one first connecting piece B, the negative tabs of the battery cells B of the battery module are disposed at the same side of the battery module and electrically connected with one second connecting piece B, the first connecting piece A and the second connecting piece A are staggered and electrically isolated from the first connecting piece B and the second connecting piece B.

15. The battery pack according to claim 14, wherein a first support frame A is arranged disposed between the battery cell A and the first connecting piece A, a second support frame A is arranged between battery cell A and the second connecting piece A, a first support frame B is arranged disposed between the battery cell B and the first connecting piece B, a second support frame B is arranged between battery cell B and the second connecting piece B.

16. The battery pack according to claim 15, wherein the positive tabs of the battery cells A extends through the first support frame A and electrically connected with the first connecting piece A, the negative tabs of the battery cells A extends through the second support frame A and electrically connected with the second connecting piece A, the positive tabs of the battery cells B extends through the first support frame B and electrically connected with the first connecting piece B, the negative tabs of the battery cells B extends through the second support frame B and electrically connected with the second connecting piece B.

17. The battery pack according to claim 14, wherein the battery cells A comprise ionic liquid electrolyte battery cells and/or solid electrolyte battery cells.

18. The battery pack according to claim 14, wherein the battery cells A in the battery module are connected in parallel, the battery cells B in the battery module are connected in parallel, the parallel connected battery cells A are connected in series with the parallel connected battery cells B, and the battery modules are connected in parallel.

19. The battery pack according to claim 14, wherein the battery cells A in the battery module are connected in series, the battery cells B in the battery module are connected in series, the series connected battery cells A are connected in parallel with the series connected battery cells B, and the battery modules are connected in parallel.

20. The battery pack according to claim 14, wherein the battery cells A in the battery module are connected in series, the battery cells B in the battery module are connected in series, the battery cells A are electrically isolated from the battery cells B, the battery modules are connected in series, the battery cells A in different battery modules are connected in series, and the battery cells B in different battery modules are connected in series.

\* \* \* \* \*